United States Patent [19]

Fujisawa et al.

[11] Patent Number: 5,476,567
[45] Date of Patent: Dec. 19, 1995

[54] METHOD AND APPARATUS FOR FABRICATING RESIN MATS

[75] Inventors: Takahiro Fujisawa, Aichi; Shigeru Nakamura, Shizuoka, both of Japan

[73] Assignees: Yamaha Gamagori Seizo Kabushiki, Aishi; Yamaha Hatsudoki Kabushiki Kaisha, Shizuoka, both of Japan

[21] Appl. No.: 38,624

[22] Filed: Mar. 26, 1993

[51] Int. Cl.$^6$ .......................... B32B 31/08; B32B 31/12; B32B 31/20
[52] U.S. Cl. .......................... 156/281; 118/70; 118/104; 118/117; 118/405; 156/324; 156/389; 156/550; 156/551; 156/555; 427/365
[58] Field of Search .................... 156/62.2, 62.8, 156/324, 500, 547, 549, 550, 551, 555, 578, 281, 389; 427/434.4, 365, 369, 211, 428; 118/70, 104, 112, 114, 115, 116, 117, 405, 249, 419, 421, 415; 264/136, 171, 175; 239/112, 119; 425/110

[56] References Cited

U.S. PATENT DOCUMENTS

| | | | |
|---|---|---|---|
| 34,021 | 12/1861 | Wilson | 156/550 |
| 302,938 | 8/1884 | Rankin | 156/550 |
| 453,567 | 6/1891 | Seybold et al. | 118/104 |
| 565,336 | 8/1896 | Ehret | 156/550 |
| 1,195,408 | 8/1916 | Smith | 156/550 |
| 1,882,715 | 10/1932 | Angier | 156/550 |
| 2,015,531 | 9/1935 | Montgomery | 118/70 |
| 3,037,900 | 6/1962 | Hings et al. | 156/551 |
| 3,121,247 | 2/1964 | Malicky et al. | 118/104 |
| 3,187,716 | 6/1965 | Peterson et al. | 118/70 |
| 3,647,526 | 3/1972 | Barnes | 118/405 |
| 3,849,174 | 11/1974 | Ancker | 427/365 |
| 3,942,230 | 3/1976 | Nalband | 29/132 |
| 4,245,785 | 1/1981 | Johansing | 239/112 |
| 4,449,476 | 5/1984 | Voswinckel et al. | 118/405 |
| 4,626,452 | 12/1986 | Poterala | 118/415 |
| 4,729,814 | 3/1988 | Jennus et al. | 156/264 |
| 4,862,713 | 9/1989 | Kutz et al. | 118/419 |
| 4,964,361 | 10/1990 | Aebersold | 118/302 |
| 5,039,368 | 8/1991 | Gunyuzlu | 156/175 |
| 5,136,972 | 8/1992 | Naka et al. | 118/419 |
| 5,205,305 | 4/1993 | Yamakita | 118/302 |

*Primary Examiner*—Steven D. Maki
*Attorney, Agent, or Firm*—Bacon & Thomas

[57] ABSTRACT

A method and apparatus for fabricating resin mats having a plurality of mat layers is provided. Multiple mat sheets are conveyed between two spaced rollers while being impregnated with resin contained in at least one reservoir formed between the rollers and sheets. A resin feeding system supplies resin to a location between the sheets which substantially corresponds to the longitudinal centerlines of the sheets to ensure adequate impregnation of the mat layers while minimizing any residual resin from adhering to the rollers. Dam members are also positioned between the rollers at the longitudinal sides of the sheets to aid in forming the reservoir(s) and also to maintain an appropriate spacing between the rollers. The roller spacing is configured to permit a predetermined degree of slippage between the rollers and the mat layers.

18 Claims, 6 Drawing Sheets

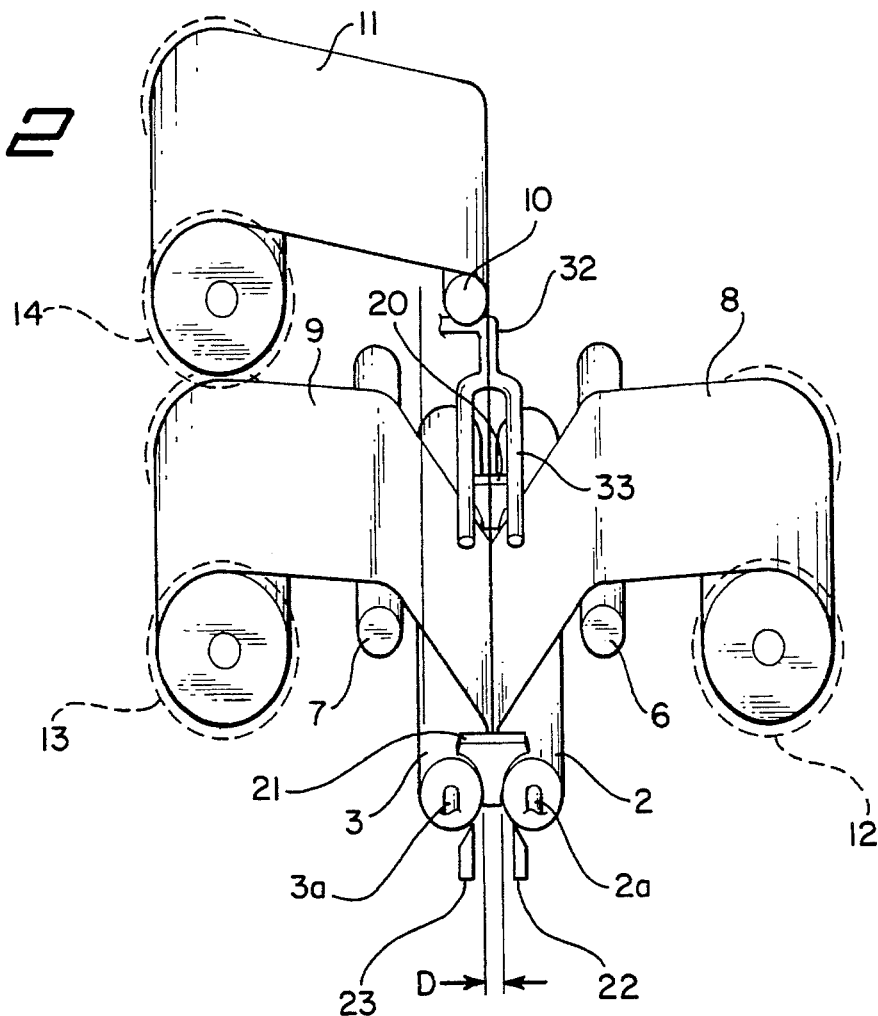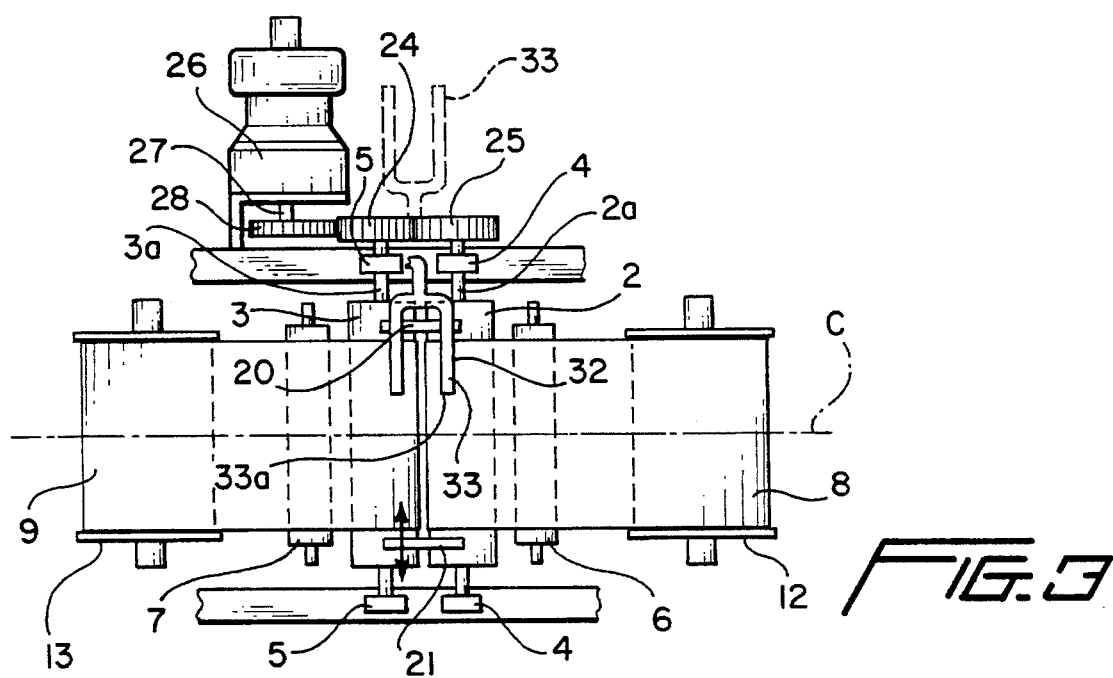

METHOD AND APPARATUS FOR FABRICATING RESIN MATS

BACKGROUND OF THE INVENTION

1. Field of the Invention

This invention pertains to a method and apparatus for fabricating resin mats. The resin mats produced by the method and apparatus may be utilized in various environments, for example, to reinforce joint areas in various parts of boats.

2. Discussion of the Prior Art

Resin mats have been used, for example, in boat hulls and decks to reinforce joints or seams, to make compartments, or to form supports. Often, this reinforcement by means of resin mats is accomplished by impregnating sheets of mat materials with resin and then applying the mat material to the joint area.

As shown in FIG. 10, one method of impregnating a mat material according to the prior art is to immerse a roll of mat material 100 in a resin-filled tank 101. After the material is impregnated in this manner, the material can be cut to a desired length. While the equipment needed for this operation is relatively simple, the roll of mat material 100 can harden before it is used or the resin in the tank can harden and make the roll of mat material 100 unusable.

Also in accordance with known prior art, as depicted in FIG. 11, it is possible to feed mat material 100 from a roll and, using a guide roller 103, to immerse the mat material 100 in a resin tank 101. The mat material 100 then passes through an advance roller 102, in order to fully impregnate the material with the resin. Finally, the mat material can be cut to a desired length for use. In this case, however, the resin in the resin tank 101 can harden or resin from the impregnated mat material 100 could adhere and harden on the advanced roller 102. In either situation, frequent maintenance is required.

Further, as also known in the art and shown in FIG. 12, mat material 100 can be conveyed from a roll by a belt conveyor 104 and then a spray nozzle 105, positioned above the belt conveyor 104, can spray resin onto the mat material 100 to impregnate it. However, just as with the arrangements depicted in FIGS. 10 and 11, when the resin is impregnated into the mats and a number of mats 100 are to be laminated together, it is necessary to apply a great deal of resin to the outside of the mat to ensure that there will be sufficient impregnation at the center of the laminate. After this operation, there exists a great deal of surplus resin on the outside which can adhere to the conveying mechanism and cause problems.

SUMMARY OF THE INVENTION

It is an object of the present invention to provide an apparatus for the fabrication of resin mats having a plurality of mat layers and, further, to provide a method for the fabrication of such impregnated resin mats.

In order to resolve the problems associated with the prior art as discussed above, a multiple layered resin mat is prepared according to the present invention by conveying mat material in the form of sheets from two sides so that the mat materials converge. At the stage just prior to the convergence of the plurality of mat materials, resin is fed between the mat materials. The resin feeding system supplies resin to opposing mat sides prior to the mat layers being merged together which enables multiple layered resin mats to be prepared using an apparatus having a very simple structure. Since resin is applied to both opposing surfaces between at least two mat sheets, the resulting mat has multiple layers. This ensures that the resin impregnation has reached the center of the mat and lessens the amount of resin adhering to the outside surface of the mat which simplifies any subsequent seaming operation for the mat. In addition, this resin supply arrangement minimizes the amount of resin which can flow from between the mat layers as the layers converge. This lessens the amount of resin which can adhere to the conveying mechanism.

Additional objects, features and advantages of the present invention will become more readily apparent from the following detailed description of a preferred embodiment of the invention when taken in conjunction with the drawings wherein like reference numerals refer to corresponding parts in the several views.

BRIEF DESCRIPTION OF THE DRAWINGS

FIG. 2 is a perspective view of the principal parts of the mat fabrication apparatus of FIG. 1.

FIG. 3 is a top view of the principal parts of the mat fabrication apparatus shown in FIG. 2.

DETAILED DESCRIPTION OF THE INVENTION

Figure 1:
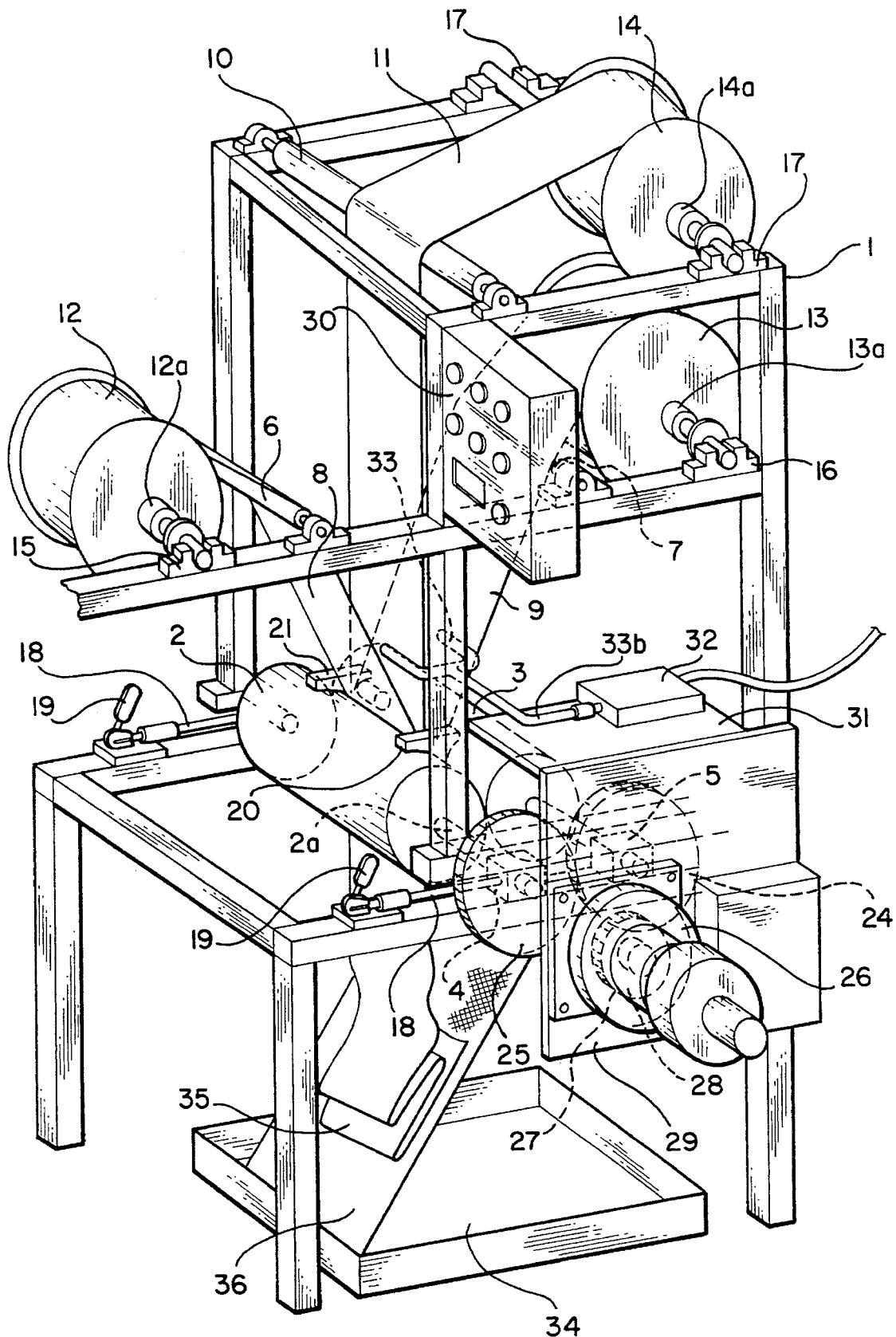
FIG. 1 shows a perspective view of the resin mat fabrication apparatus constructed in accordance with the invention.

With initial reference to FIGS. 1–3, the frame of the mat fabrication apparatus according to the present invention is generally indicated at 1. Although the resin mats fabricated by this apparatus are generally of the type used to reinforce seams or joints in boats, it should be understood that these resin mats may also have other applications as well.

The mat fabrication apparatus includes a pair of impregnating rollers 2, 3 which are rotatably mounted upon frame 1, with a predetermined gap or space therebetween. More specifically, impregnating rollers 2, 3 include respective shaft ends 2a, 3a which are rotatably supported by bearing units 4, 5 respectively attached to frame 1. Frame 1 further carries a pair of spaced guide rollers 6, 7 which are adapted to guide respective mat materials 8, 9 in the form of sheets to the area between impregnating rollers 2, 3 as will be discussed more fully below. In the preferred embodiment, mat materials 8, 9 comprise glass sheets made from cut glass fibers which have been hardened with a polyester resin powder.

An additional guide roller 10 is rotatably mounted upon frame 1 at a position between and above guide rollers 6, 7 as shown in FIG. 1. Roller 10 is adapted to guide an intermediate mat material 11 between mat materials 8, 9 to the space between impregnating rollers 2, 3. In the preferred embodiment, intermediate mat material 11 comprises roping sheets made from woven glass fibers. Each of the mat materials 8, 9 and 11 are adapted to be conveyed simultaneously in a manner such that the sheets are merged together when passed between impregnating rollers 2, 3 by an advancing drive system as will be more fully discussed below.

Mat materials 8, 9 are carried by respective spools 12, 13 upon which are rolled a certain length of matting. In a similar manner, intermediate mat material 11 is carried by a spool 14. Spools 12, 13 and 14 have associated therewith shafts 12a, 13a and 14a which are rotatably mounted by means of respective bearing units 15, 16 and 17, fixedly secured to frame 1, so that spools 12, 13 and 14 are free to rotate relative to frame 1. Although not particularly shown in the drawings, the particular height at which shafts 12a, 13a and 14a are supported by bearings 15–17 may be adjustable so as to assure that no positional shifting between mats 8, 9 and 11 occur as the sheets are being conveyed between impregnating rollers 2, 3.

With particular reference to FIG. 1, beating units 5, which rotatably support shaft 3a of impregnating roller 3, are fixedly secured to frame 1. On the other hand, bearing units 4, which rotatably support shaft 2a of impregnating roller 2, are movably mounted relative to frame 1 such that the distance between bearing units 4, 5 is adjustable. More specifically, bearing units 4 are interconnected by rods 18 to a pair of operating levers 19. Operating levers 19 are adapted to be locked once the desired spacing between impregnating rollers 2, 3 is established. To establish this locked condition, mat materials 8, 9 and 11 are first set fully in place. By this arrangement, impregnating roller 2 can be separated from impregnating roller 3 by releasing operating levers 19.

Positioned at spaced axial locations between impregnating rollers 2, 3 are a pair of dam members 20, 21. Dam members 20, 21 are adapted to be fixed relative to frame 1 once a predetermined distance between dam members 20 and 21 has been established by means of an arm (not shown). The distance between dam members 20, 21 is adapted to be set so as to conform to the width of mat materials 8, 9 and 11. One function of dam members 20, 21 is to serve as position indexers for the mat sheets. According to the preferred embodiment of the invention, one of the dam members, for example dam member 21, is movably mounted relative to dam member 20 which, in turn, is fixed to frame 1. In this manner, only one dam member needs to be adjusted to provide for mat sheets of varying widths.

Dam members 20 and 21 also aid in setting the distance (indicated at D in FIG. 2) between impregnating rollers 2, 3. The setting of this roller distance D is a key element in obtaining an appropriate level of impregnation, as will be more fully discussed below, since the setting conforms to the sum of the free thickness of each of the mat materials 8, 9 and 11. Dam members 20, 21 further serve to prevent the leakage of resin which is sprayed between both mat materials 8, 11 and mat materials 9, 11 by means of a nozzle 33 in the manner which will be more fully discussed below. In addition, dam members 20, 21 function to maintain an appropriate resin reservoir thereby improving the utilization efficiency of the resin by enhancing the consistent application of the resin to the mats. Therefore, dam members 20, 21 are structural elements that establish a resin reservoir while preventing leakage of resin outwardly from between the mat sheets.

In the preferred embodiment, the resin utilized is a thermoplastic resin. In addition, impregnating rollers 2, 3 and dam members 20, 21 are respectively formed from metal pipe, such as iron, to which a Teflon coating has been applied. This not only allows any adhering resin to be wiped away easily, but it also makes it possible for rollers 2, 3 to rotate smoothly.

Positioned below impregnating rollers 2, 3 as best indicated in FIG. 2 is a pair of wiping scrapers 22, 23. Wiping scrapers 22, 23 extend across substantially the entire length of impregnating rollers 2, 3. Wiping scrapers 22, 23 serve to wipe off the resin or the glass fibers from the mat materials that may adhere to impregnating rollers 2, 3 during operation of the mat fabrication apparatus, thereby allowing impregnating rollers 2, 3 to convey the mat materials 8, 9 and 11 with a desired amount of slippage.

The advancing or drive mechanism incorporated in the mat fabrication apparatus of the present invention will now be described. A driven gear 24 is carded by and rotates with shaft 3a of impregnating roller 3. Driven gear 24 is interengaged with a follower gear 25 which is attached to shaft 2a of impregnating roller 2. A motor unit 26, preferably fixedly secured to frame 1, includes an output shaft 27 which carries a output or drive gear 28. Output gear 28 is interengaged with driven gear 24. In this manner, rotation of output shaft 27 by motor 26 functions to rotate output gear 28, driven gear 24 and follower gear 25. Rotation of drive gear 24 and follower gear 25, on the other hand, cause impregnating rollers 2, 3 to rotate.

In the preferred embodiment, motor 26 constitutes a pneumatic motor, however, it should be readily understood that various other types of motors known in the an may be utilized. Motor 26 is attached to a plate 29 which is affixed to the side of frame 1. A controller 30 is also mounted upon frame 1 and is adapted to control the operation of motor 26 in a manner known in the art. A support platform 31 is attached to the top of plate 29 and extends inwardly, substantially parallel to shafts 2a and 3a. Mounted upon support platform 31 is a resin feed device 32. As best shown in FIG. 1, projecting from one end of resin feed device 32 is a tubular end portion 33b of nozzle 33. As clearly shown in FIG. 1, end portion 33b of nozzle 33 includes a 90° bend. Resin feed device 32 is adapted to receive a supply of resin through a supply line (not labeled) and to deliver a controlled quantity of resin to nozzle 33 through tubular end portion 33b. As clearly shown in FIGS. 1–3, nozzle 33 forks into two branches or supply lines, each of which extends along an opposite side of mat material 11. In other words, one of the forked branches is positioned between mat materials 8, 11 while the other forked branch is positioned between mat materials 9, 11. In this manner, when resin is fed to nozzle 33, the resin is fed on both sides of mat material 11 which enables the resin to become thoroughly impregnated in mat material 11. The ends of the forked branches of nozzle 33 are positioned such that the resin is directed from outlets 33a of nozzle 33 at the longitudinal centerline C of mat materials 8, 9 and 11 as indicated in FIG. 3.

When work is halted, nozzle 33 can be rotated about tubular base portion 33b toward the outside of frame 1 by 180° so as assume the position shown by the broken lines in FIG. 3. Shifting nozzle 33 in this manner enables a cleaner, such as acetone, to be fed through the resin feed device 32 and nozzle 33 which prevents the resin within the nozzle 33 from hardening.

Positioned beneath impregnating rollers 2, 3 is a resin mat collecting pan 34. During the resin impregnation process, resin mat pan 34 is adapted to collect the fabricated resin mat 35 made by the apparatus which is guided to resin mat pan 34 via guide plate 36. By this arrangement, since the fabricated resin mat 35 is located atop guide plate 36 which, in turn, is located beneath wiping scrapers 22, 23, any resin which is scraped off impregnating rollers 2, 3 by wiping scrapers 22, 23 will fall atop resin mat 35 and will thereby be put into effective use.

As previously stated, mat materials 8, 9 and 11 are conveyed simultaneously between impregnating rollers 2, 3 and, during this process, the intermediate mat 11 has resin applied to it from both sides. The combination of the dam members 20, 21 and mat materials 8, 9 and 11 form resin reservoirs as the mat materials are laminated to form resin mat 35 having a plurality of layers. This arrangement assures that a continual impregnation of the mat materials will be accomplished and greatly reduces the amount of resin leakage at the outer longitudinal edges of the mat materials while reducing the amount of resin which may adhere to the impregnating rollers 2, 3. Furthermore, in addition to assuring resin impregnation of the mat materials, this arrangement improves the quality of the bond between the mat layers thereby creating a resin mat 35 that has consistent, quality formed seams.

Figure 4:
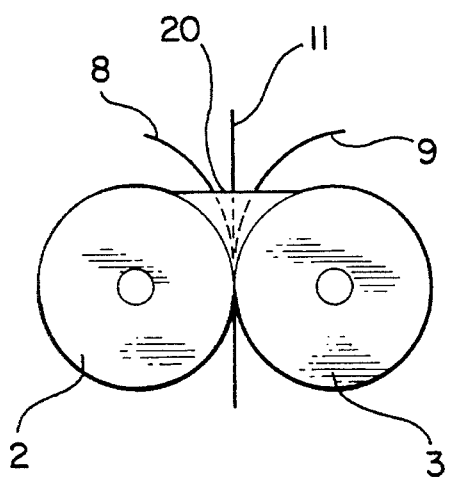
FIG. 4 depicts an initial set-up stage for the resin mat fabrication process.
Figure 5:
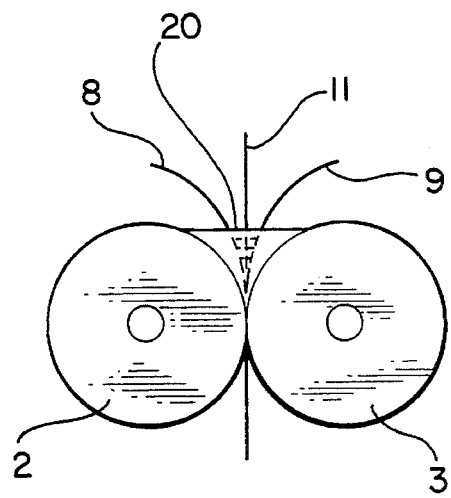
FIG. 5 shows the preliminary impregnation stage in the resin mat fabrication process.

The manner in which resin mat 35 is prepared with the resin mat fabrication apparatus of the present invention will now be described with particular reference to FIGS. 4–8. Magazines 12, 13 and 14, which hold mat materials 8, 9 and 11 respectively, are supported axially on frame 1 in the manner set forth above. When operating levers 19 are shifted to their lock release positions, impregnating roller 2 is initially moved farther away from impregnating roller 3 so as to increase the spacing therebetween. This enables the ends of mat materials 8, 9 and 11 to be brought down between the pair of impregnating rollers 2, 3. Operating levers 19 are then pivoted to shift impregnating roller 2 toward impregnating roller 3 and then are locked in position. This operation sets the proper distance between impregnating rollers 2, 3 in dependence upon the thickness of mat materials 8, 9 and 11 and secures the ends of mat materials 8, 9 and 11 in place (FIG. 4).

Figure 8:
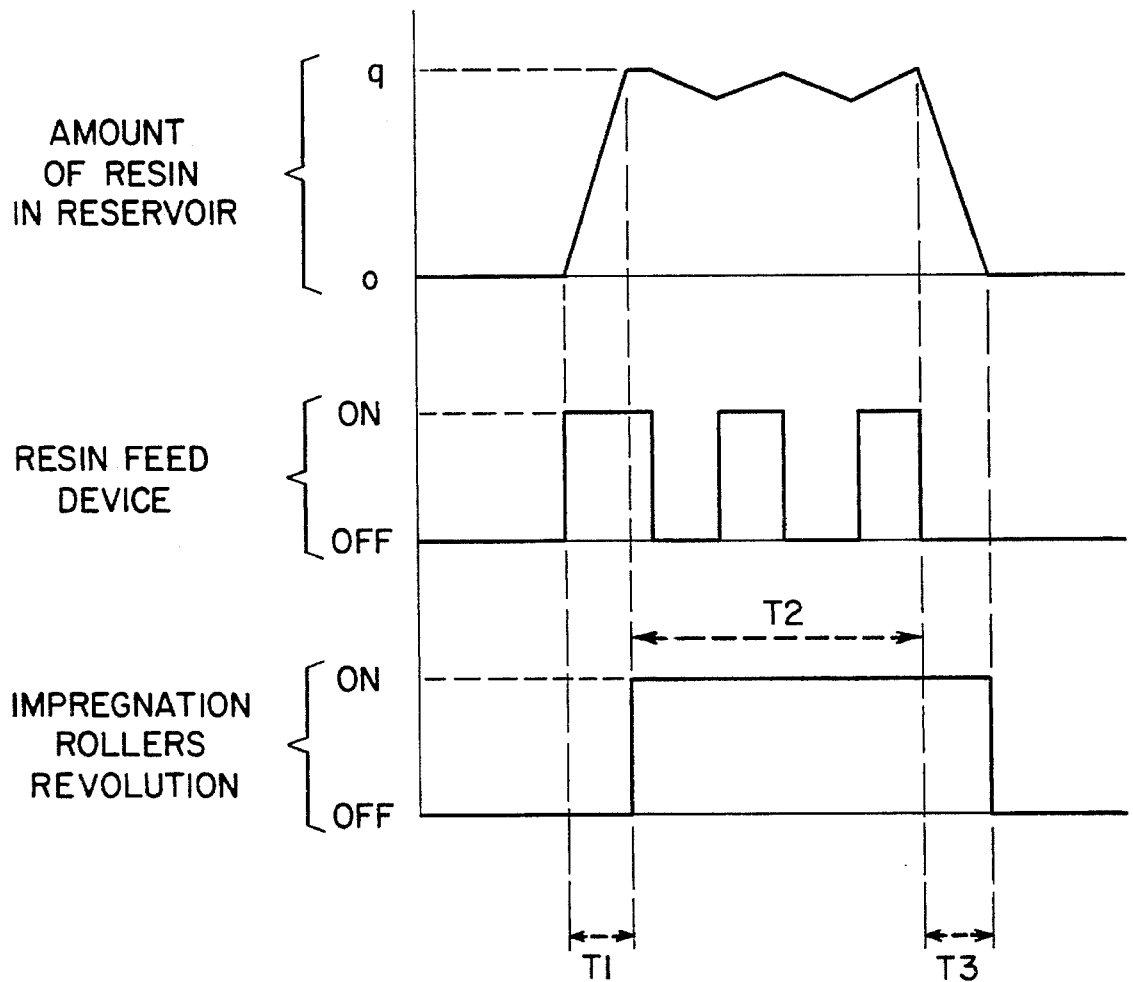
FIG. 8 shows a time chart for the operation of the resin mat fabrication apparatus.

After mat materials 8, 9 and 11 have been set in place, the resin feed device 32 is actuated and, after resin feed device 32 has run for a period of time T1 as shown in FIG. 8, impregnating rollers 2, 3 are rotated by means of motor 26. Time T1 corresponds to a preliminary impregnation time. More specifically, time T1 is the time required for the resin reservoirs to build up between the mat materials 8, 9 and 11 and dam members 20, 21.

Figure 6:
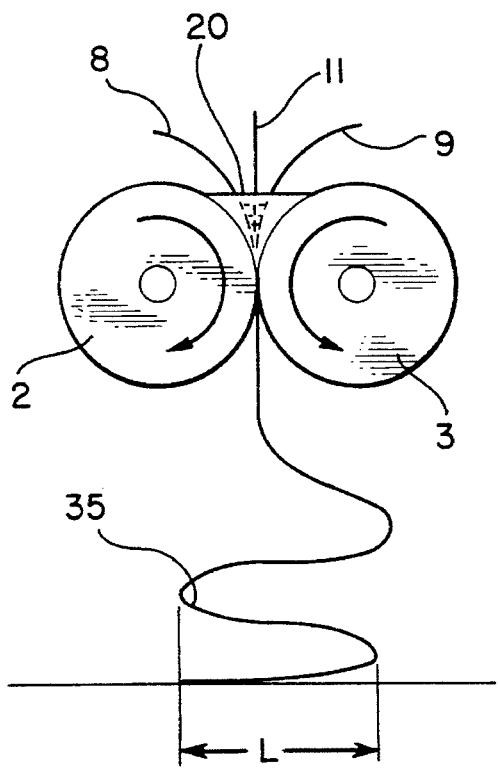
FIG. 6 shows a mat fabrication stage in accordance with the resin mat fabrication process of the invention.

Time T2 indicated in FIG. 8 is the operational time of the apparatus or, in other words, the prescribed intermittent running time established by a duty ratio wherein resin mat 35 is fabricated while maintaining the resin reservoirs at a specified resin capacity in a manner generally shown in FIG. 6. Resin mat 35 can then be cut to desired lengths and then used for various proposes.

Figure 7:
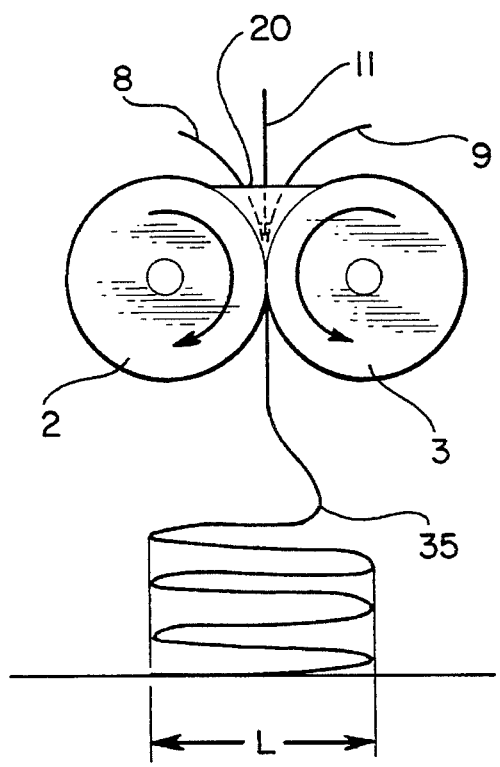
FIG. 7 depicts a terminating stage of the resin mat fabrication process.

When terminating the fabrication of resin mat 35, the resin feed device 32 is shut off and the impregnating rollers 2, 3 are still driven for a specified period of time T3 (FIG. 8) until the resin remaining in the reservoirs are completely expelled by the impregnation of mat materials 8, 9 and 11 (FIG. 7). By driving impregnating rollers 2, 3 after resin feed device has been shut off, all of the resin from the reservoirs can be effectively expelled which prevents excess resin from adhering to the impregnating rollers 2, 3. This, in turn, permits the apparatus to be readily used again.

Although not particularly shown in the drawings, a cutting machine may be located beneath impregnating rollers 2, 3 to automatically cut the resin mat 35 to desired lengths as mat 35 is formed. Or, as shown in FIGS. 6 and 7, the resin impregnated mat 35 may be folded back and forth, perhaps with the aid of a folding machine, to a desired folding length L.

The diameter of impregnating rollers 2, 3 are selected such that the amount of resin contained in the reservoirs is greater than the amount of resin needed to impregnate mat materials 8, 9 and 11. In the preferred embodiment, the minimum amount of resin contained in the reservoirs equals that necessary to form a resin mat 35 having a length of approximately 1 meter. In other words, the resin reservoir should hold an amount of resin which is greater than that needed to impregnate resin materials 8, 9 and 11 in fabricating one laminate resin mat. In FIG. 8, this quantity is indicated by "q". In addition, it is important that the roller diameter be such that the resin does not overflow over the top of the impregnating rollers 2, 3.

Since there is enough resin in the resin reservoirs to impregnate mat materials 8, 9 and 11 in order to make a resin mat 35 having a predetermined length, the mat materials 8, 9 and 11 can also be pre-impregnated prior to impregnating rollers 2, 3 so as to assure that there is effective impregnation of the mat materials 8, 9 and 11 by impregnating rollers 2, 3. The height of the resin reservoirs can be just less than the height of impregnating rollers 2, 3, as determined by their respective diameters, so that the assembly can be made as compact as possible. On the other hand, it has been found that even better impregnation can be assured by making the diameters of impregnating rollers 2, 3 rather large such that the top of impregnating rollers 2, 3 is much higher than the reservoir level. This serves to lengthen the contact time between impregnating rollers 2, 3 and the mat materials 8, 9 and 11.

As shown in FIG. 8, impregnating rollers 2, 3 are not rotated until the "q" amount of resin has accumulated in the reservoirs. According to another aspect of the invention, operation of the apparatus can also be halted when the resin reservoir falls below the "q" level. Halting the operation of the apparatus in this manner would assure a good yield of resin mat from the pre-impregnated mat materials 8, 9 and 11.

It is also possible in the spirit of the present invention to lengthen the circumferential length of impregnating rollers 2, 3 as compared to the amount of mat materials 8, 9 and 11 fed per unit time. In other words, mat materials 8, 9 and 11 can be fed between impregnating rollers 2, 3 at a speed such that impregnating rollers 2, 3 slip against the outside surface of mat materials 8, 9. In feeding mat materials 8, 9 and 11, impregnating rollers 2, 3 would have to be strongly pressed against mat materials 8, 9 and 11 in order to prevent any slippage. Pressing impregnating rollers 2, 3 strongly against mat materials 8, 9 and 11 could cause much of the impregnating resin to be wrung out of the mat materials. However, by allowing impregnating rollers 2, 3 to slip against mat materials 8, 9 and 11, it assures that there will be sufficient resin left to fully impregnate mat materials 8, 9 and 11. By making the distance between impregnating rollers 2, 3 equal to the sum of the free thickness of the mat materials 8, 9 and 11, one can ensure that there is an appropriate amount of resin impregnated so long as mat materials 8, 9 and 11 are fed at a suitable speed by impregnating rollers 2, 3.

Figure 9:
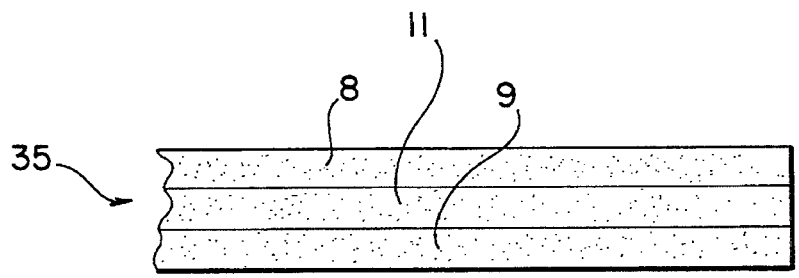
FIG. 9 is a cross-sectional view of a resin mat produced in accordance with the invention.
Figure 10:
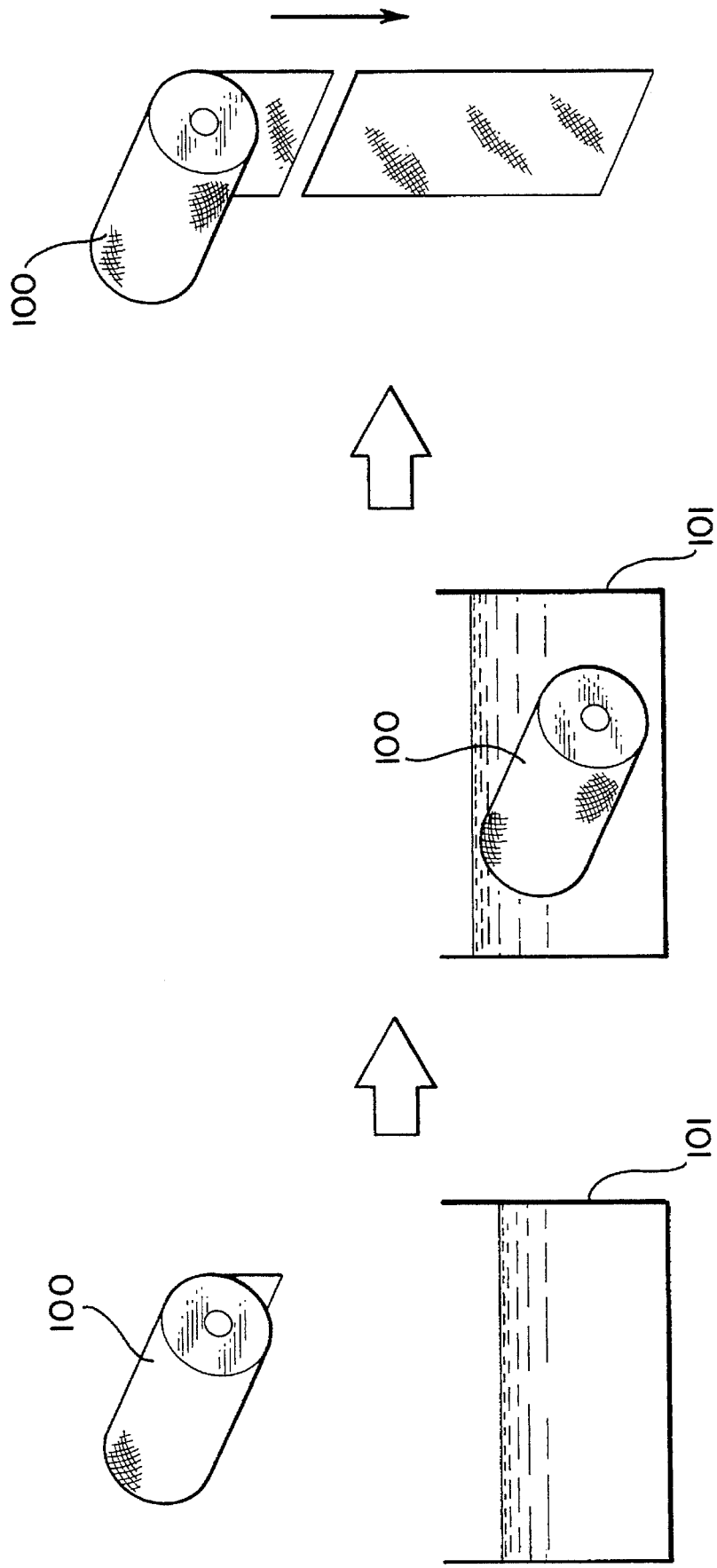
FIG. 10 depicts a known resin impregnation method for mat materials.
Figure 11:
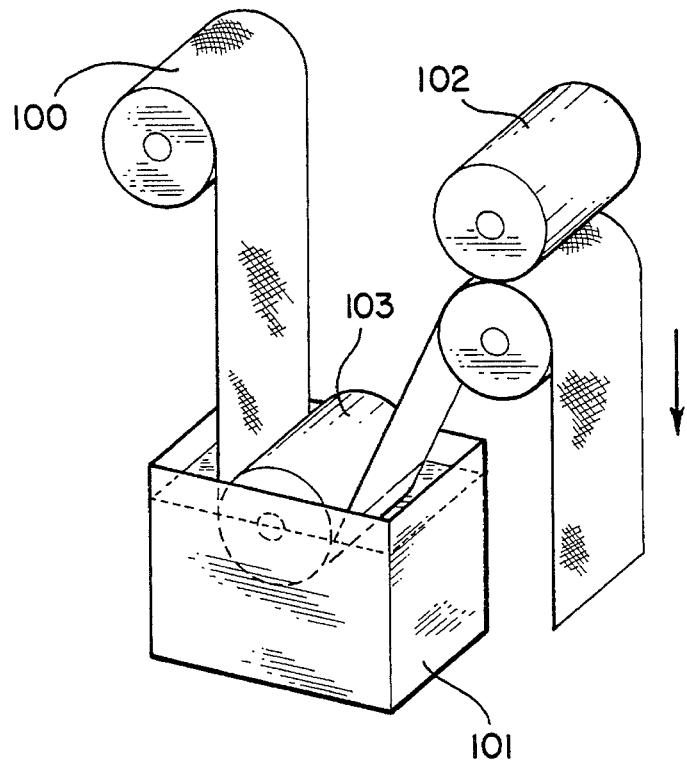
FIG. 11 depicts another known resin impregnation method for mat materials.
Figure 12:
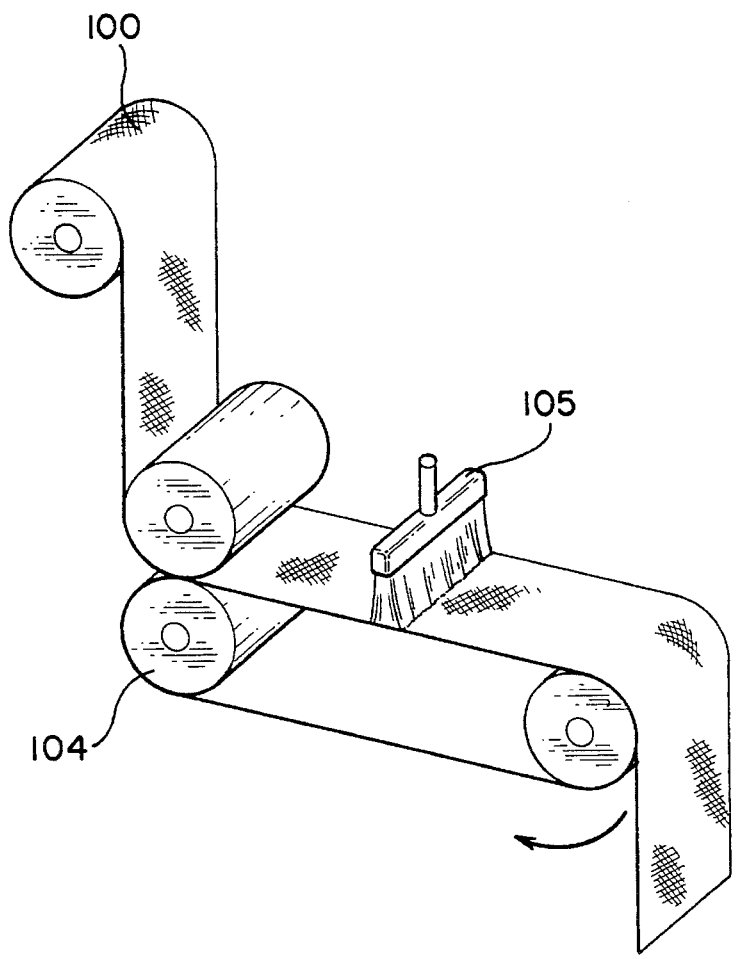
FIG. 12 depicts still another known resin impregnation method for mat materials.

Although the present invention has been described with respect to a particular fabrication apparatus, along with a particular type of resin mat 35 produced, it should be readily understood that various changes and/or modifications may be made to the present invention as described without departing from the spirit of the invention. For instance, although resin mat 35 described above was formed with 3 layers (see FIG. 9), it should be readily understood that the apparatus of the present invention may be used to make a mat having two or more layers. In addition, the apparatus of the present invention was described as including a pair of dam members 20, 21 to ensure that the reservoirs of resin were formed between them and the mat materials 8, 11 and 9, 11 respectively, but the use of such dam members is not absolutely necessary. For example, the time required before driving impregnating rollers 2, 3 could be shortened in combination with not utilizing these dam members. In general, the invention is only intended to be limited by the scope of the following claims.

We claim:

1. An apparatus for fabricating resin mats comprising:
   a frame;
   first and second mat material spools each housing a supply of first and second mat layers respectively;
   a pair of rollers which are rotatably mounted about respective rotational axes on said frame in a spaced, substantially parallel configuration;
   means for advancing said first and second mat layers in alignment from said first and second mat material spools to between said pair of rollers; and
   means for feeding resin between said first and second mat layers prior to said mat layers being advanced through said pair of rollers, said means for feeding resin delivering resin to opposing sides of said first and second mat layers, wherein said first and second mat layers become impregnated with resin and are joined by advancing through said pair of rollers, said means for feeding resin being rotatable relative to said frame so as to be shiftable between a resin feeding position located between said first and second mat layers and a non-resin feeding position whereby said means for feeding resin may be rotated to a position remote from said first and second mat layers whereat said means for feeding resin can be cleaned, said means for feeding resin adapted to have a cleaner fed therethrough when in the non-resin feeding position.

2. An apparatus as claimed in claim 1, wherein said means for feeding resin supplies the resin at a location substantially corresponding to the longitudinal centerlines of said first and second mat layers.

3. An apparatus as claimed in claim 1, further including a third mat material spool housing a supply of a third mat layer, said third mat layer being delivered to said pair of rollers between said first and second mat layers.

4. An apparatus as claimed in claim 3, wherein said means for feeding resin includes first and second feed lines which supply resin between said first and third mat layers and between said second and third mat layers respectively.

5. An apparatus as claimed in claim 4, wherein said means for feeding resin includes a bifurcated nozzle constituted by said first and second feed lines.

6. An apparatus as claimed in claim 5, wherein said means for feeding resin supplies the resin at a location substantially corresponding to the longitudinal centerlines of said first and second mat layers.

7. An apparatus as claimed in claim 1, further comprising means for forming at least one resin reservoir between said first and second mat layers, said means for forming including said first and second mat layers and said pair of rollers.

8. An apparatus as claimed in claim 1, further including first and second dam members positioned between said pair of rollers on either longitudinal side of said first and second mat layers such that said first and second mat layers are located between said first and second dam members, said first and second dam members further defining said at least one reservoir, one of the dam members being movable in an axial direction parallel to the rotational axes of the rollers.

9. An apparatus as claimed in claim 8, wherein said first and second dam members and said pair of rollers are coated with a friction reducing film.

10. An apparatus as claimed in claim 1, further including means for selectively adjusting the space provided between said pair of rollers.

11. An apparatus as claimed in claim 1, further including a pair of scraper members carried by said frame and extending across and closely adjacent a respective one of said pair of rollers at a position located below the location in which said first and second mat layers are advanced between said pair of rollers, said scraper members functioning to wipe any residual resin off said pair of rollers that seeps through said first and second mat layers and onto said pair of rollers.

12. A method of fabricating resin mats comprising:
   advancing first and second mat layers through a gap formed between a pair of spaced rollers and a pair of dam members positioned between and adjacent opposing ends of said pair of rollers;
   positioning a resin feeding device at a resin feeding position located between the first and second mat layers;
   actuating the resin feeding device and delivering resin from said resin feeding device to opposing sides of said first and second mat layers for a period of time in order to build up at least one resin reservoir between the mat layers and the dam members while the spaced rollers are stationary;
   rotating the pair of spaced rollers to advance the mat layers through the space between the rollers thereby causing the mat layers to become impregnated with resin and be joined together;
   terminating the fabrication of resin mats by de-actuating said resin feeding device while continuing to rotate the pair of spaced rollers until the resin remaining in the at least one resin reservoir is consumed and then stopping the rotation of the pair of spaced rollers; and
   rotating said resin feeding device from said resin feeding position located between said first and second mat layers to a non-resin feeding position whereat said means for feeding resin can be cleaned wherein said non-resin feeding position is remote from said first and second mat layers.

13. The method of fabricating resin mats as claimed in claim 12, further comprising feeding said resin to a location substantially corresponding to the longitudinal centerlines of the mat layers.

14. The method of fabricating resin mats as claimed in claim 13, further comprising advancing at least three mat layers while feeding resin between both the first and third mat layers and the second and third mat layers simultaneously.

15. The method of fabricating resin mats as claimed in claim 14, further forming multiple reservoirs of resin between said pair of rollers with one of the reservoirs being located between said first and third mat layers and another reservoir being located between said second and third mat layers.

16. The method of fabricating resin mats as claimed in claim 12, further comprising setting the spacing between the pair of impregnating rollers so as to permit slippage between the mat layers and the rollers.

17. The method of fabricating resin mats as claimed in claim 12, further comprising continually wiping away residual resin from the rollers as the mat layers are advanced therethrough.

18. An apparatus for fabricating resin mats comprising:

a frame;

first and second mat material spools each housing a supply of first and second mat layers respectively;

a pair of rollers rotatably mounted about respective rotational axes on said frame in a spaced, substantially parallel configuration;

means for advancing said first and second mat layers in alignment from said first and second mat material spools to between said pair of rollers;

means for feeding resin between said first and second mat layers prior to said mat layers being advanced through said pair of rollers, said means for feeding resin delivering resin to opposing sides of said first and second mat layers, wherein said first and second mat layers become impregnated with resin and are joined by advancing through said pair of rollers, said means for feeding resin being rotatable relative to said frame so as to be shiftable between a resin feeding position located between said first and second mat layers and a non-resin feeding position whereby said means for feeding resin may be rotated to a position remote from said first and second mat layers whereat said means for feeding resin can be cleaned; and first and second dam members positioned between said pair of rollers on either longitudinal side of said first and second mat layers such that said first and second mat layers are located between said first and second dam members, said first and second dam members further defining said at least one reservoir, at least one of the dam members being movable in an axial direction parallel to the rotational axes of the rollers.

* * * * *